United States Patent
Green et al.

(10) Patent No.: US 10,351,364 B2
(45) Date of Patent: Jul. 16, 2019

(54) AUTOMATIC VEHICLE AND CONVEYOR POSITIONING

(71) Applicant: Deere & Company, Moline, IL (US)

(72) Inventors: Lawrence D. Green, Bettendorf, IA (US); Michael E. Frasier, Iowa City, IA (US)

(73) Assignee: Deere & Company, Moline, IL (US)

( * ) Notice: Subject to any disclaimer, the term of this patent is extended or adjusted under 35 U.S.C. 154(b) by 11 days.

(21) Appl. No.: 15/229,414

(22) Filed: Aug. 5, 2016

(65) Prior Publication Data
US 2018/0037424 A1   Feb. 8, 2018

(51) Int. Cl.
| | | |
|---|---|---|
| *B65G 69/00* | (2006.01) | |
| *B65G 43/00* | (2006.01) | |
| *B65G 67/04* | (2006.01) | |
| *B65G 67/24* | (2006.01) | |
| *A01B 69/00* | (2006.01) | |
| *A01B 79/00* | (2006.01) | |
| *G05D 1/02* | (2006.01) | |
| *A01B 69/04* | (2006.01) | |

(52) U.S. Cl.
CPC .......... *B65G 69/00* (2013.01); *A01B 69/008* (2013.01); *A01B 79/005* (2013.01); *B65G 43/00* (2013.01); *B65G 67/04* (2013.01); *B65G 67/24* (2013.01); *G05D 1/0293* (2013.01); *B65G 2203/0283* (2013.01); *G05D 2201/0201* (2013.01)

(58) Field of Classification Search
CPC ........ B65G 69/00; B65G 43/00; B65G 67/04; B65G 67/24; B65G 2203/0283; A01B 69/00; A01B 79/00
See application file for complete search history.

(56) References Cited

U.S. PATENT DOCUMENTS

| | | | |
|---|---|---|---|
| 7,500,814 B2 | 3/2009 | Meyer | |
| 8,738,238 B2 | 5/2014 | Rekow | |
| 2013/0045067 A1 | 2/2013 | Pickett et al. | |
| 2013/0211658 A1* | 8/2013 | Bonefas | B65G 67/24 701/28 |
| 2014/0257619 A1 | 9/2014 | Rekow | |
| 2014/0360148 A1* | 12/2014 | Grosse Wienker | A01D 43/14 56/16.8 |
| 2016/0152424 A1 | 6/2016 | Henry | |
| 2016/0176650 A1* | 6/2016 | Brown | E01C 19/48 198/311 |
| 2016/0295792 A1* | 10/2016 | Secrest | A01C 21/005 |
| 2017/0208742 A1* | 7/2017 | Ingibergsson | A01D 41/1208 |

FOREIGN PATENT DOCUMENTS

WO   9949406 A1   9/1999

OTHER PUBLICATIONS

EP Application No. 17179866.3 Extended European Search Report dated Dec. 21, 2017. 10 pages.

* cited by examiner

*Primary Examiner* — Rodney A Butler
(74) *Attorney, Agent, or Firm* — Joseph R. Kelly; Kelly, Holt & Christenson PLLC

(57) ABSTRACT

An equipment control system detects a physical position of a first vehicle, carrying a material to deliver, relative to a second vehicle. A physical position of a conveyor is controlled, relative to an outlet opening defined on the first vehicle and an inlet opening defined on the second vehicle. The material is then illustratively automatically conveyed from the first vehicle to the second vehicle.

20 Claims, 13 Drawing Sheets

AUTOMATIC VEHICLE AND CONVEYOR POSITIONING

FIELD OF THE DESCRIPTION

The present description relates to an equipment control system. More specifically, the present description relates to automatically positioning vehicles and a conveyor system to convey material between the vehicles.

BACKGROUND

There are a wide variety of different types of industries where material is conveyed from a first vehicle to a second vehicle using a conveyor mechanism. For instance, it is not uncommon in the construction industry for material to be conveyed from one vehicle to another. The same is true of the agricultural industry, and a wide variety of other industries.

By way of specific example, in the agricultural industry, a variety of different materials are often conveyed between vehicles. For instance, fertilizer, seed, chemicals and other commodities are often brought into fields in a variety of different tender vehicles. The commodity is then conveyed from the tender vehicle to an implement that will be used to apply the commodity to the field being treated. Conveying the commodity from the tender vehicle to the implement often involves lining the two vehicles up, both in the side-by-side orientation and in the fore-aft orientation. This can be a cumbersome process, and it may be exacerbated by the size or complexity of the vehicles being used. For instance, wheat and fertilizer are often brought to the fields in semi hopper bottom trailers. The semi is driven near a commodity cart and multiple attempts may be needed in order to get the lateral and fore/aft positions of the cart, relative to the hopper bottom, correct.

Once the vehicles are positioned appropriately, an operator may then move a conveyance system into position between the two vehicles to perform a conveyance operation. The conveyance system may be an auger or paddle chain or belt conveyer or other type of conveyer. It may be carried by the cart or by the semi, or may be a standalone conveyor. It can have a bottom hopper that is positioned underneath the semi hopper bottom, and that receives the commodity from the semi. It may also have a spout on the top of the conveyor (the outlet end of the conveyor) that deposits the commodity into a tank on the implement. The lid on the tank is then opened, as is the door on the semi-hopper and the conveyance operation is performed.

An operator must often manually open the semi hopper bottom door or this may be done using a hydraulic or electric device to assist opening, in order to start flow of the commodity to the conveyor. Similarly, the operator must often manually open the cart lid, or the operator may use a hydraulically or electrically assisted device, to open the cart lid. The filling operation may need to be visually monitored and manual intervention may be used to shut off product flow once the tank is filled to the appropriate level, with the commodity.

Once the conveyance operation is completed, the conveyor may then be repositioned to fill another tank on the implement. The semi hopper bottom may also need to be repositioned if a second type of product is being conveyed. These types of operations can result in the implement, the conveyance system, and the semi (or other tender vehicle), being repositioned several times. This may also result in the conveyance system being moved several times up and down the semi-trailer, and also up and down the implement.

The discussion above is merely provided for general background information and is not intended to be used as an aid in determining the scope of the claimed subject matter.

SUMMARY

It can be seen from the above discussion that the conveyance operation for conveying a material from a first vehicle to a second vehicle is a highly manual process that can be cumbersome and time consuming. Similarly, if the items are not positioned correctly, seed or other commodity can easily be spilled at the inlet or outlet ends of the conveyor. The operation can also take a relatively long time, especially if the implement and/or tender vehicle need to be repositioned to transfer multiple different types of material.

An equipment control system detects a physical position of a first vehicle, carrying a material to deliver, relative to a second vehicle. A physical position of a conveyor is controlled, relative to an outlet opening defined on the first vehicle and an inlet opening defined on the second vehicle. The material is then automatically conveyed from the first vehicle to the second vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed in previous sections, there are a wide variety of different industries in which material is conveyed between vehicles. They can include, for instance, the construction industry, the agricultural industry, and a wide variety of other industries. The present description will describe a conveyance operation in the agricultural industry, between a tender vehicle (e.g., a semi hopper bottom vehicle) and an implement (e.g., an air seeder) but this is just one example.

Figure 1:
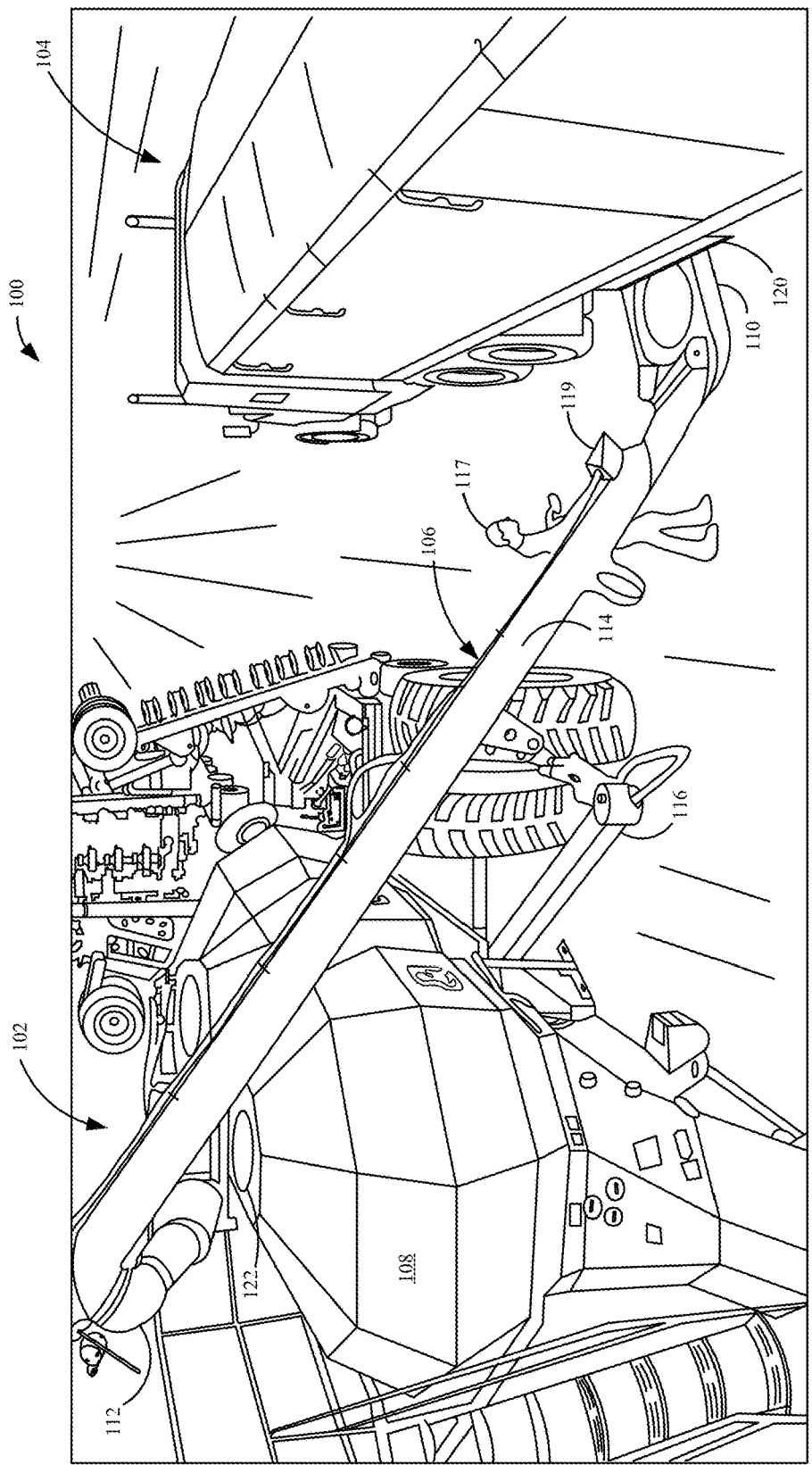
FIG. 1 is a pictorial illustration showing vehicles and a conveyance system in a conveyance architecture.

FIG. 1 is a pictorial illustration of one example of a conveyance system architecture 100. Architecture 100 illustratively includes implement (e.g., air seeder) 102 and tender vehicle (e.g., semi hopper bottom vehicle) 104, along with a conveyance system 106. In the example illustrated in FIG. 1, seed is illustratively conveyed from semi hopper bottom 104 to a tank 108 on air seeder 102 using conveyance system 106. In the example shown in FIG. 1, conveyance system 106 is illustratively a conveyor (e.g., an auger) that is carried by air seeder 102. The conveyance system 106 can also be carried by tender vehicle 104, or it can be a standalone conveyance system as well. That shown in FIG. 1 is shown for the sake of example only.

Conveyance system 106 illustratively has an input end (e.g., a hopper) 110 and an output end (e.g., a spout) 112. It has a conveyor 114 that conveys material received at hopper 110 up to the spout 112 where the material is discharged or expelled from conveyance system 106. Conveyance system 106 is illustratively coupled to air seeder 102 through linkage 116. In one example, linkage 116 can include an actuator (such as a hydraulic motor, an electric motor, etc.) that can be used to position the hopper 110 and spout 112 relative to vehicles 102 and 104. The actuator can be controlled by operator 117 through a suitable control panel 119.

In some prior systems, in order to perform a conveyance operation, operators first manually position implement 102 relative to tender vehicle 104 in both the side-by-side positions and the fore/aft position so that conveyance system 106 can be positioned to convey material from tender vehicle 104 to implement 102. This is often a cumbersome and time consuming process and may require multiple attempts before the two vehicles are in the proper position. Once in position, conveyance system 106 (whether it is carried by implement 102 or tender vehicle 104) is normally, unpinned from its storage or travel position and manually positioned so that hopper 110 is under the door 120 of tender vehicle 104, and so that spout 112 is lined up with the correct tank lid 122 for the material being conveyed. Lid 122 and door 120 were then manually opened. This alignment process, itself, often takes considerable time to ensure that the material being conveyed is not spilled at the entry into hopper 110, and at the exit from spout 112.

Once door 120 is opened, this starts the flow of material being conveyed from vehicle 104 to hopper 110, and conveyance system 106 is activated to begin the conveyance operation.

In order to ensure proper operation, manual monitoring has been performed to ensure that the proper amount of material is conveyed to implement 102, but without any overflow. Once the implement 102 is filled to the appropriate level, and conveyance system 106 is shut off, it then needs to be repositioned into its travel or storage position, and secured to the vehicle by which it is supported, or it needs to be positioned away from both vehicles, if it is a standalone conveyor. Also, if multiple different types of material are to be conveyed from tender vehicle 104 to implement 102, then conveyance system 106 often needs to be manually repositioned so that hopper 110 and spout 112 are properly positioned for conveyance of the next material. In addition, when a second material is to be conveyed, the relative position of tender vehicle 104 and implement 102 often needs to be adjusted. This can take yet more time and effort.

Figure 2:
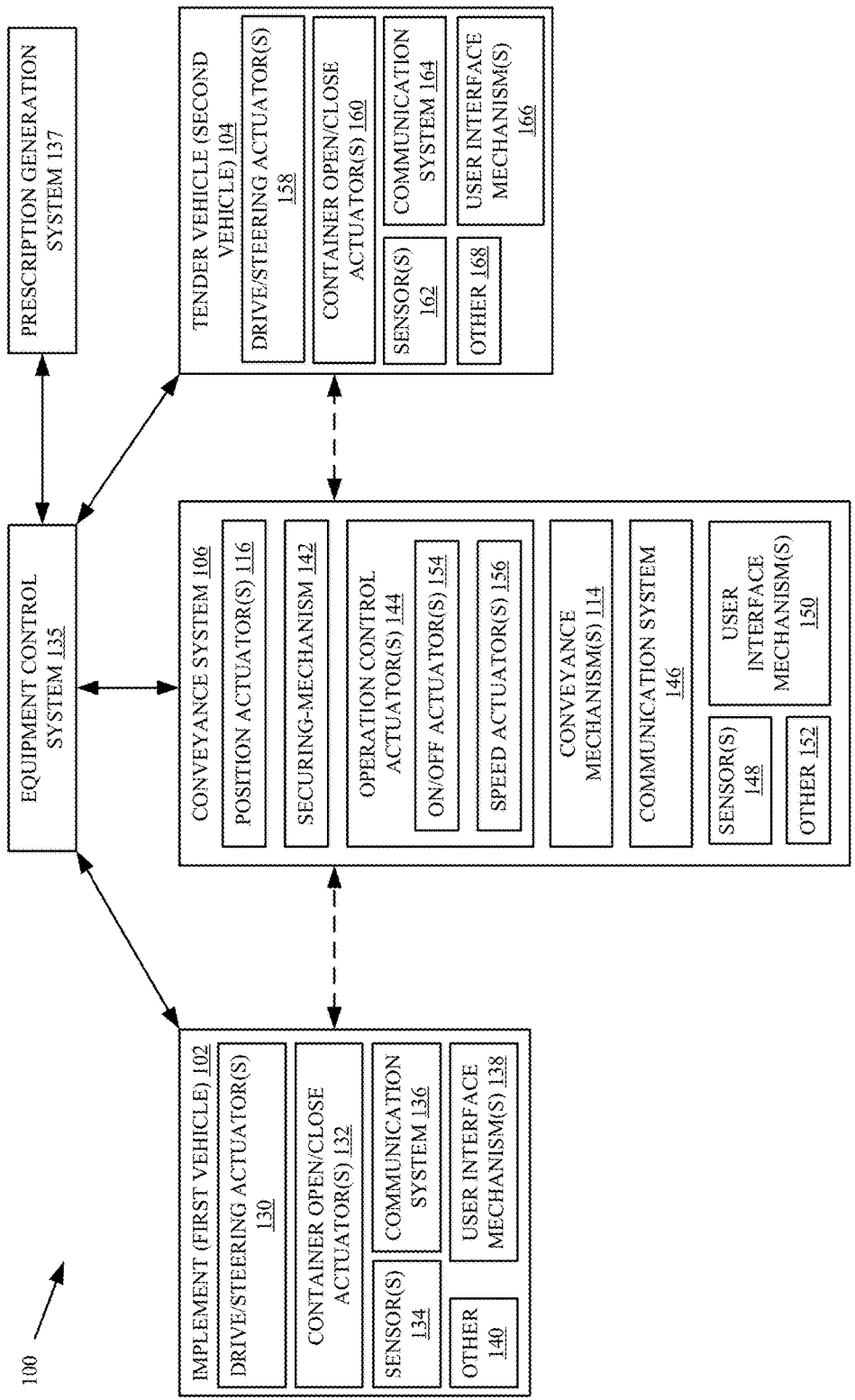
FIG. 2 is a block diagram showing one example of portions of the conveyance system illustrated in FIG. 1, in more detail.

FIG. 2 is a block diagram showing one example of the items illustrated in architecture 100 (from FIG. 1) in more detail. Some of the items illustrated in FIG. 2 are similar to those shown in FIG. 1, and they are similarly numbered. Architecture 100 includes not only vehicles 102 and 104 and conveyance system 106, but it also includes, in one example, equipment control system 135 and prescription generation system 137.

In the example shown in FIG. 2, implement 102 illustratively includes drive and steer actuators 130 that are used to drive movement of implement 102, and to steer it. Such actuators can be an engine coupled to a drive train which, in turn, drives wheels, tracks, etc. to propel implement 102. They can include actuators to control the direction of travel of implement 102. In addition, the drive and steer actuators may be on a towing vehicle, in a scenario in which implement 102 is towed. Thus, they may be on a tractor or other towing vehicle.

Implement 102 also illustratively includes container (or tank) open/close actuators 132. Actuators 132 illustratively drive lid 122 (shown in FIG. 1) between its opened and closed positions.

Implement 102 can include sensors 134, communication system 136, one or more user interface mechanisms 138, and it can include a wide variety of other items 140. Sensors 134 can illustratively sense a wide variety of different items relative to implement 102. For instance, they can be tank level sensors that sense a fill level of tank 108. They can include sensors that sense whether lid 122 is open or closed. They can include one or more geographic position sensors that sense the geographic position and orientation of implement 102. They can include relative position sensors (such as radar, LIDAR, an imaging system, etc.) that sense a relative position of implement 102 relative to tender vehicle 104 and/or conveyance system 106. They can be sensors that sense other characteristics of the material being conveyed, such as its weight, mass flow, etc.

Communication system 136 can be any of a wide variety of different types of communication systems. For instance, it can be a cellular communication system, a near field communication system, a controller area network communication system, or a wide variety of other wired or wireless communication systems.

User interface mechanisms 138 can be actuated by a user to control and manipulate implement 102, and they can also be used to convey information to the user. Thus, user interface mechanisms 138 can include not only output mechanisms (such as a display, an audible output system, a haptic output system, etc.) but also input mechanisms (such as a steering wheel, pedals, levers, keypads, touch sensitive displays, a speech recognition system, etc.).

In the example shown in FIG. 2, conveyance system 106 not only includes position actuators 116 (discussed above with respect to FIG. 1), but it also illustratively includes securing mechanism actuators 142, operation control actuators 144, communication system 146, one or more sensors 148, user interface mechanisms 150, and it can include a wide variety of other items 152. Operation control actuators 144 can include, for instance, on/off actuators 154, speed actuators 156, and it can include other items as well. Position actuators 116, as described above, can be one or more actuators that illustratively position the ends of conveyance system 106 relative to vehicles 102 and 104. They can be manually operated actuators, electric or hydraulic actuators, or a wide variety of other actuators.

Securing mechanism actuators 142 illustratively actuate securing mechanisms, for instance, when conveyance system 106 is carried by one of vehicles 102 and 104. For example, they may be actuators that can be actuated to remove a pin so that conveyance system 106 can be moved from its storage or travel position into the conveying position between the vehicles. The actuator may also be actuated to insert the pin or otherwise secure conveyance system 106 in its travel or storage position after the conveyance operation is complete.

Operation control actuators 144 illustratively control the operation of conveyance system 106, during the conveyance operation. On/off actuators 144 may illustratively be actuated to turn the conveyance mechanism 114 on and off. Speed actuators 156 may illustratively be actuated to control the speed of travel of the conveyance mechanism 114 and thus to control the speed at which material is conveyed between vehicles 102 and 104.

Communication system 146 can be similar to conveyance system 136 on vehicle 102, or different. Sensors 148 can sense a wide variety of different things. For instance, sensors 148 can include a geographic position sensor that senses the geographic location of conveyance system 106, and in particular the two ends 110 and 112 of conveyance system 106. They can include relative position sensors that sense the position of the ends of conveyance system 106 relative to different portions of the two vehicles 102 and 104. For instance, sensors 148 may provide a signal so that the position of the spout 112 of conveyance system 106, relative to the opening in tank 108, can be determined. Similarly, they may provide a signal so that the location of hopper 110, relative door 120, can be obtained as well. Sensors 148 can also include a wide variety of other sensors, such as sensors that sense a characteristic of the conveyed material. For instance, it may include a mass flow sensor that senses the mass flow or otherwise senses the quantity of material being conveyed. Sensors 148 can include a wide variety of other sensors as well.

User interface mechanisms 150 may include mechanisms (such as those on control panel 119 or on a remotely located control system) that can be actuated by a user 117 in order to control conveyance system 106. For instance, they may include a joystick, levers, buttons, etc. Similarly, user interface mechanisms 150 may generate a signal that represents a user interface display that can be displayed to a user either locally at conveyance system 106, or remotely (such as in one of vehicles 102 or 104, or such as at another remote location).

In the example shown in FIG. 2, tender vehicle 104 also illustratively has drive/steering actuators 158, container open/close actuators 160, one or more sensors 162, communication system 164, user interface mechanisms 166, and it can include a wide variety of other items 168. Drive/steering actuators 158 can illustratively be actuated to drive vehicle 104, and to steer it. Container open/close actuators 106 can be actuated to open and close the closure mechanism (or door) 120 on vehicle 104. Sensors 162 can be similar to sensors 134 on vehicle 102, or different. They can provide a geographic location of vehicle 104, as well as an orientation of vehicle 104. In another example, they can provide a relative position signal indicative of a position of vehicle 104, relative to either vehicle 102 or conveyance system 106, or both. Sensors 162 can also include sensors that sense a characteristic of the conveyed material. They can sense weight, mass flow, or other indicia or quantity. Sensors 162 can include a wide variety of other sensors as well, such as a sensor indicative of the level of material in vehicle 104, the level of material in different tanks in vehicle 104, or a wide variety of other sensors.

Communication system 164 can be a cellular communication system, a controller area network communication system, or a near field communication system. It can be a wide variety of other wired or wireless communication systems as well.

User interface mechanisms 166 can be mechanisms that can be actuated by a user to control and manipulate vehicle 104. They may include a steering wheel, pedals, levers, a joystick, buttons, etc. In addition, they may include mechanisms that convey information to the user, such as a visible display device, a haptic output mechanism, an audio output mechanism, among a wide variety of others.

Figure 3:
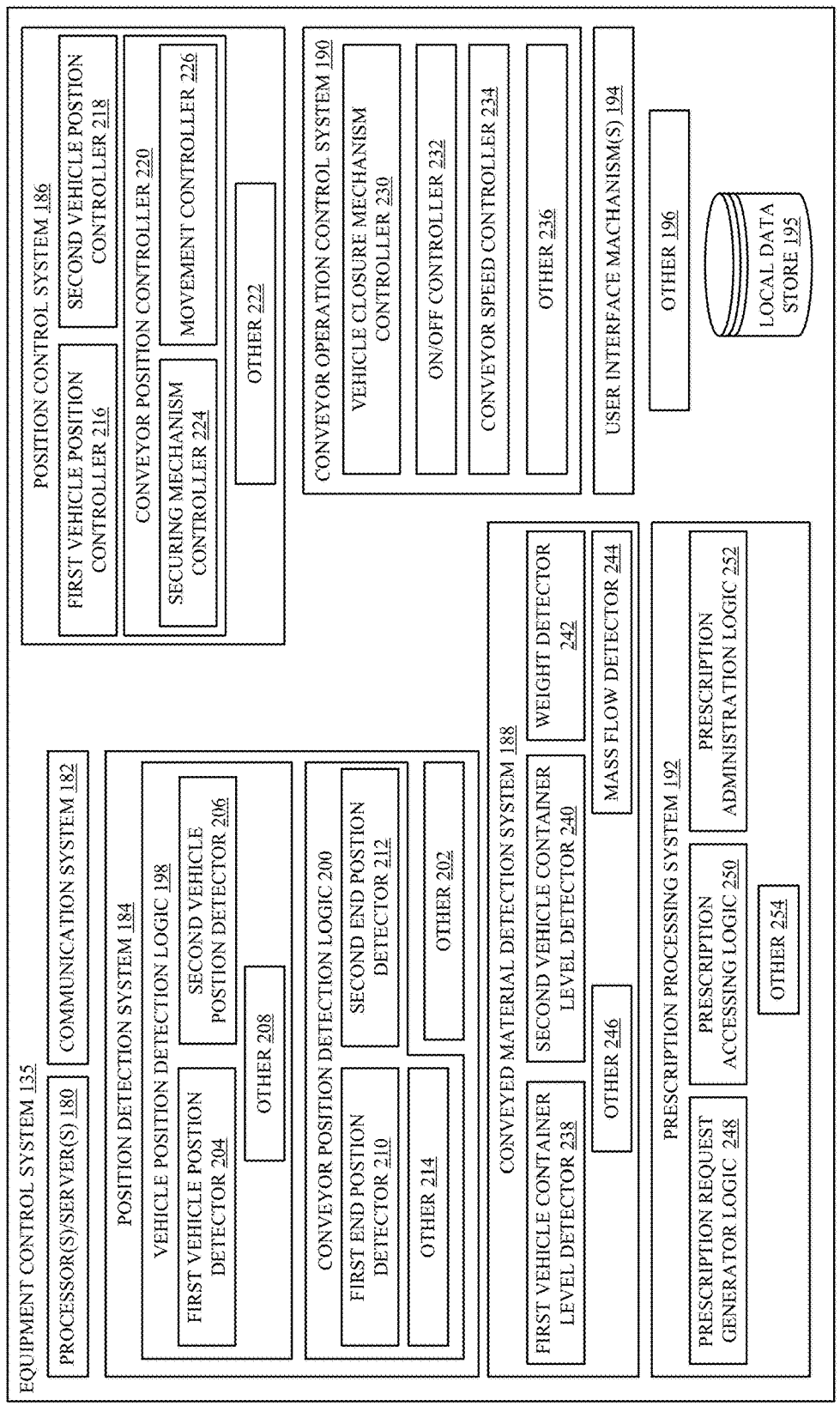
FIG. 3 is a block diagram showing one example of an equipment control system in more detail.

Equipment control system 135 is described in more detail below with respect to FIG. 3. Briefly, it illustratively receives sensor signals from a variety of sensors and then controls vehicles 102 and 104 so that they are in a desired position relative to one another so that material can be conveyed using conveyance system 106 between the two vehicles. Equipment control system 135 also controls positioning of conveyance system 106 for conveyance of the desired material. In addition, system 135 can control various actuators in architecture 100 so that once vehicles 102 and 104, and conveyance system 106, are all properly positioned, the closure mechanisms (e.g., door 120 and lid 122) on vehicles 102 and 104 can be opened and conveyance mechanism 114 in conveyance system 106 can be started to convey a desired amount of material between the two vehicles (e.g., from tender vehicle 104 to implement 102). Equipment control system 135 also illustratively receives one or more sensor signals indicative of when the desired amount of material has been conveyed, and it can then shut off conveyance system 106, automatically position it back in its storage or travel position and secure it there. It can then also control the container open/close actuators 132 and 160 to close the containers on vehicles 102 and 104, as appropriate.

Prescription generation system 137 is described in more detail below with respect to FIGS. 5 and 6. Briefly, it illustratively generates a prescription for the material to be conveyed, indicative of how much of the material is to be conveyed from tender vehicle 104 to implement 102. As will be described below, the prescription may be based on the particular field being treated, the particular material that is being applied to the field, an application rate for the material, how much of the field has already been treated, etc. Equipment control system 135 thus controls architecture 100 so that the prescribed amount of material is conveyed from tender vehicle 104 to implement 102. The sensors in architecture 100 illustratively provide signals indicative of when that amount has been transferred. By way of example, sensors 134 may include a fill level sensor that senses the level of material in the tank 108 on vehicle 102. When the fill level sensor provides a signal indicative of a desired fill level, equipment control system 135 can shut off the conveyance operation. This is just one example and others will be described in greater detail below.

Before describing the operation of architecture 100 in more detail, one example of equipment control system 135 will first be described. FIG. 3 is a block diagram showing one example of equipment control system 135, in more detail. In the example shown in FIG. 3, equipment control system 135 illustratively includes one or more processors or servers 180, communication system 182, position detection system 184, position control system 186, conveyed material detection system 188, conveyor control system 190, prescription processing system 192, and user interface mechanism 194. It can include a wide variety of other items 196 as well. It will also be noted that some items in equipment control system 135 may be distributed within architecture 100. For instance, some of the items can be located on vehicle 102 or vehicle 104 or conveyance system 106. They can be located on remote systems as well. Alternatively, or in addition, those items can be centralized on equipment control system 135, and the entire system 135 can be located on one of vehicles 102 or 104, or on conveyance system 106 or at a remote location. All of these and other architectures are contemplated herein.

Position detection system 184 illustratively allows equipment control system 135 to detect the relative position of vehicles 102 and 104 and the position of conveyance system 106. Thus, position detection system 184, in one example, includes vehicle position detection logic 198, conveyor position detection logic 200, and it can include other items 202. Vehicle position detection logic 198 illustratively includes first vehicle position detector 204, second vehicle position detector 206, and it can include other items 208. Detectors 204 and 206 can be sensors that sense the position (e.g., location and orientation) of vehicles 102 and 104 or that sense their position relative to one another. Detectors 204 and 206 can also include logic that receives such sensor signals and calculates the positions of the two vehicles, relative to one another. They illustratively provide an output indicative of whether the two vehicles are in a proper position relative to one another so that conveyance system 106 can be positioned to convey the desired material from one vehicle to the other. Therefore, they may provide a signal also indicative of a position of the opening in vehicle 104, that is closed by door 120, relative to the opening in tank 108, that is closed by tank lid 122, since these are the two openings that conveyance system 106 will need to be positioned between. This is given by way of example only.

Conveyor position detection logic 200 illustratively includes first end position detector 210, second end position detector 212, and it can include other items 214. Detectors 210 and 212 illustratively provide a signal indicative of the position of spout 112 and hopper 110 of conveyance system 106 relative to the opening in tank 108 and the door or closure mechanism 120 on vehicle 104. They can provide information that is directly indicative of their relative positions, or they can provide signals from which processor or server 180 can calculate those positions. They illustratively provide a signal that allows position detection system 184 to indicate whether conveyance mechanism 106 is properly positioned so that it can convey the desired material between the two vehicles. Position control system 186 illustratively allows equipment control system 135 to control the position of the two vehicles 102 and 104, as well as the position of conveyance system 106. Therefore, in one example, system 186 illustratively includes first vehicle position controller 216, second position vehicle position controller 218, conveyor position controller 220, and it can include other items 222. Conveyor position controller 220, itself, illustratively includes securing mechanism controller 224 and movement controller 226.

First vehicle position controller 216 illustratively provides one or more control signals that control the speed and position of first vehicle 102. Therefore, it can provide a control signal that actuates the drive and steering actuators 130 on vehicle 102. In another example, it provides a signal that indicates to an operator of vehicle 102 how the operator should control the actuators (e.g., it tells the operator where to steer the vehicle, and in which fore/aft direction, to be in the proper position). Second vehicle position controller 218 can be similar to first vehicle position controller 216, or different. Thus, it can automatically control tender vehicle 104, to position it in a desired position, or it can provide an output signal indicating to an operator of vehicle 104 how to position the vehicle, or it can operate in other ways.

Conveyor position controller 220 illustratively generates control signals to control the position of conveyance system 106. Securing mechanism controller 224 illustratively provides a signal to actuate securing mechanism actuators 142 in order to release the conveyance system 106 from its storage or travel position, and in order to secure it back in that position when the conveyance operation is finished. Movement controller 226 illustratively controls position actuators 116 so that the two ends 110 and 112 of conveyance system 106 can be positioned, as desired, with respect to the two vehicles 102 and 104.

Conveyor operation control system 190 illustratively includes vehicle closure mechanism controller 230, on/off controller 232, conveyor speed controller 234, and it can include other items 236. Conveyor operation control system 190 illustratively controls the items in architecture 100 in order to commence, perform, and stop the conveyance operation. Therefore, in one example, vehicle closure mechanism controller 230 provides a control signal to control actuators 132 and 160 on the two vehicles in order to open and close the doors or lids of the tanks or containers on those vehicles. On/off controller 232 illustratively provides a control signal to on/off actuators 154 on conveyance mechanism 106 in order to turn on and off the conveyance mechanism 114. Conveyor speed controller 234 illustratively generates a control signal to control speed actuators 156 to control the speed of operation of conveyance mechanism 114.

Conveyed material detection system 188 illustratively includes first vehicle container level detector 238, second vehicle container level detector 240, weight detector 242, mass flow detector 244, and it can include a wide variety of other items 246. First and second vehicle container level detectors 238 and 240 illustratively provide a signal indicative of a level of material in the tanks of the two vehicles, respectively. Weight detector 242 can illustratively detect a weight of conveyed material that has been conveyed or that is being conveyed. In another example, it provides a signal that is indicative of the weight so that processor or sever 180 can calculate the weight based on that signal. Mass flow detector 244 illustratively generates a signal indicative of a mass flow of the conveyed material through conveyance system 106. This, in conjunction with a time signal indicative of how long the conveyance operation has been performed, can also provide an indication of the quantity of conveyed material that has been conveyed.

Prescription processing system 192 can include prescription request generator logic 248, prescription accessing logic 250, prescription administration logic 252, and it can include other items 254. It will be noted that equipment control system 135 can control the conveyance operation to convey a material from tender vehicle 104 to implement 102 to fill the tank 108 of implement 102, without a prescription. In such a scenario, system 135 can control the positions of vehicles 102 and 104 relative to one another, as described above, and it can automatically position conveyance system 106 to perform the conveyance operation. It then conveys enough material to fill the tank 108 on implement 102 to a desired level. In such a scenario, no prescription is used.

However, where a prescription is to be used, prescription request generator logic 248 determines when equipment control system 135 is going to control a conveyance operation for a particular field. It then generates a request to prescription generation system 137, requesting system 137 to either generate (if it has not already been generated) or to make available (if it has already been generated) a prescription indicative of an amount of a material to be conveyed during the upcoming conveyance operation.

In one example, prescription generation system 137 automatically downloads the prescription to prescription processing system 192, where it is accessed by prescription accessing logic 250. In another example, prescription accessing logic 250 retrieves the prescription from prescription generation system 137. In either case, the prescription is obtained by prescription accessing logic 250 and provided to the various other items in equipment control system 135 so that the desired amount of material can be conveyed, according to the prescription.

Prescription administration logic 252 administers the prescription by controlling the various systems and items in equipment control system 135 so that the prescribed amount of material is conveyed from tender vehicle 104 to implement 102. For instance, logic 252 may identify an amount of material, that is to be applied to the field, per acre. It may then identify a number of acres that have already been treated or a number of acres that remain to be treated, and calculate the quantity of material that is to be conveyed, according to the prescription. It can then provide that information to, or generate control signals to control, the various systems in order to conduct the conveyance operation such that the desired amount of material is conveyed.

Figure 4A:
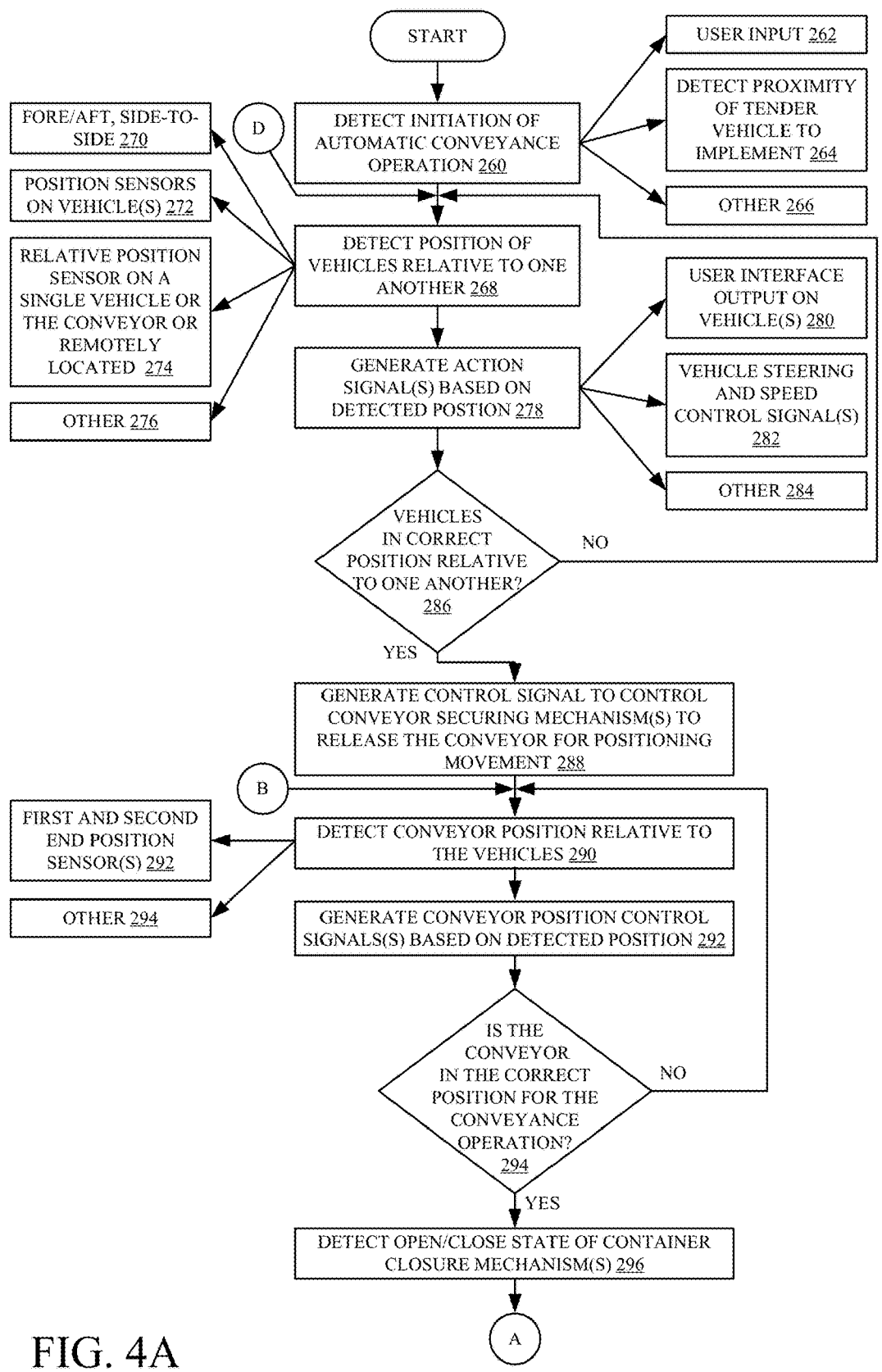
FIGS. 4A-4C (collectively referred to herein as FIG. 4) illustrate a flow diagram showing one example of the operation of the items illustrated in previous figures, in conducting a conveyance operation.
Figure 4B:
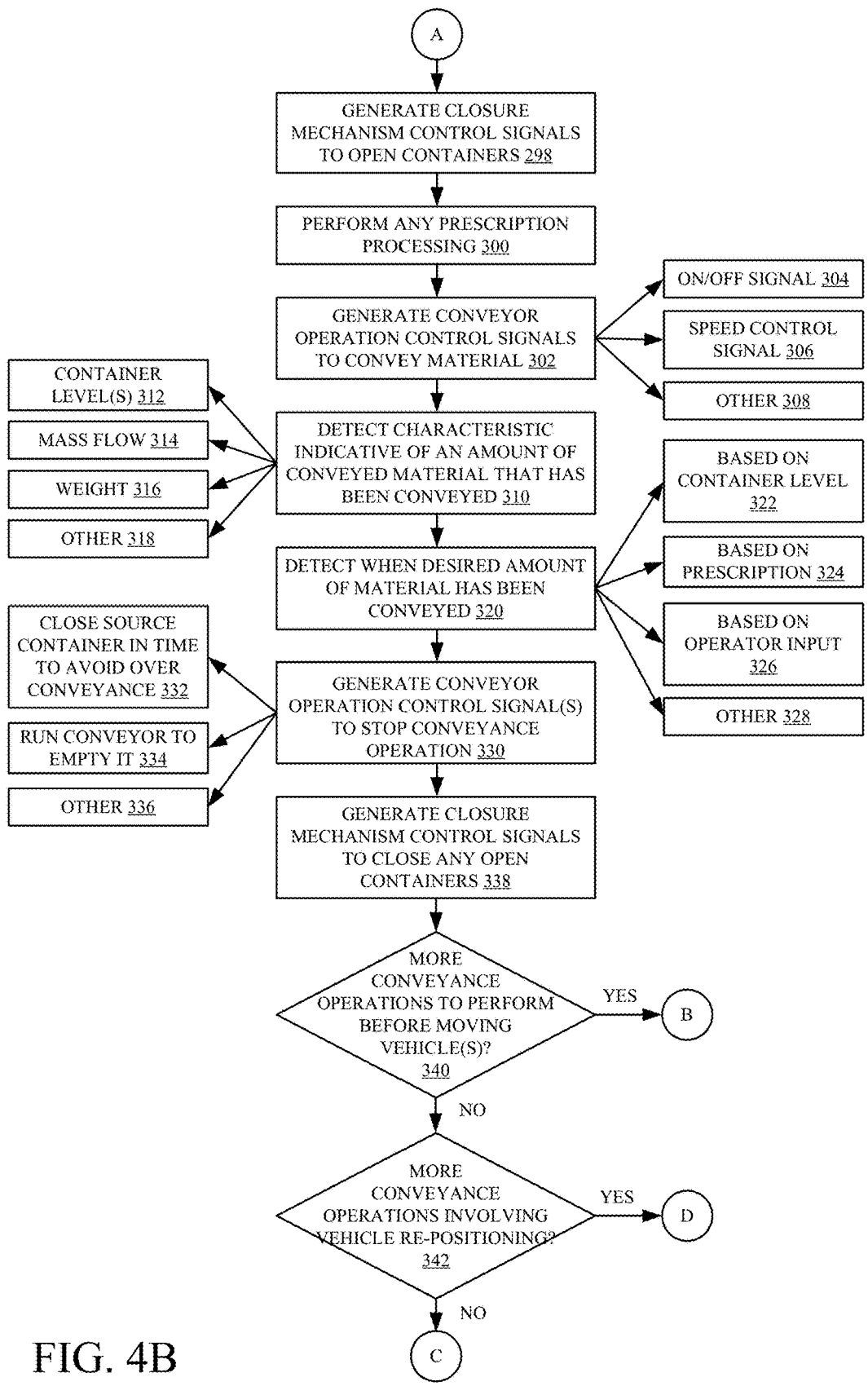
Figure 4C:
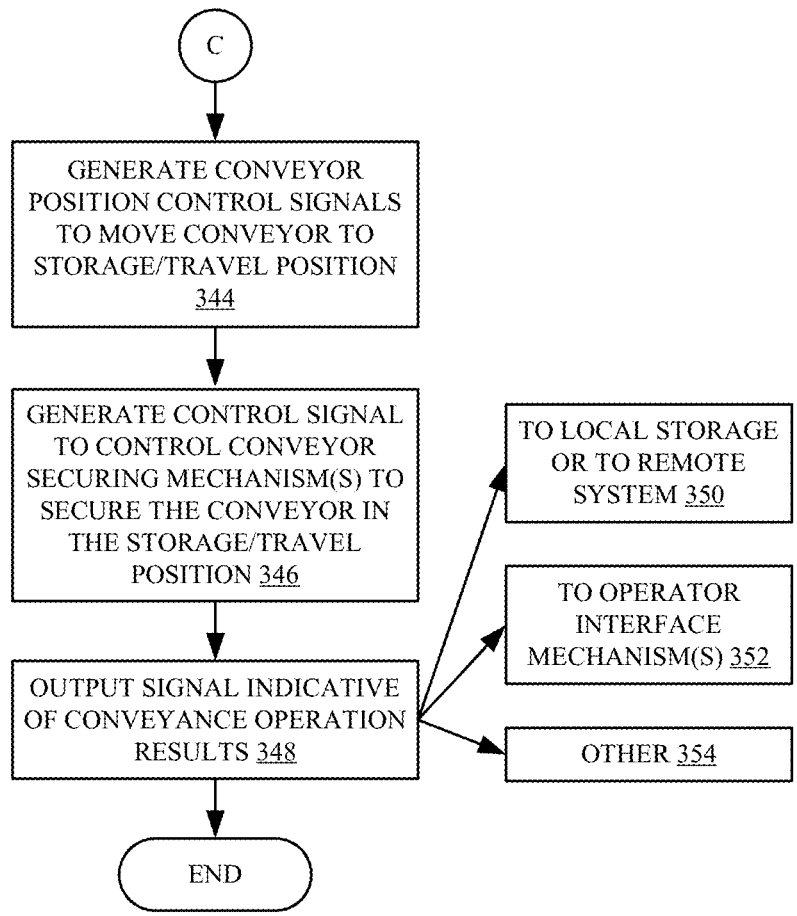

FIGS. 4A-4C (collectively referred to herein as FIG. 4) illustrate a flow diagram showing one example of the operation of equipment control system 135, in positioning the various items in architecture 100 and in performing a conveyance operation. Equipment control system 135 first detects that an automatic conveyance operation is to be initiated. This is indicated by block 260 in FIG. 4. This can be detected in a wide variety of ways. For instance, a user may provide a user input 262 indicating that a conveyance operation is to be performed. In another example, vehicle position detection logic 198 may detect that vehicles 102 and 104 are in close proximity to one another, and this may indicate that a conveyance operation is to be performed. This is indicated by block 264. The initiation of an automatic conveyance operation can be detected in a wide variety of other ways as well, and this is indicated by block 266.

Vehicle position detection logic 198 then detects the position of the two vehicles 102 and 104 relative to one another. This is indicated by block 268 in the flow diagram of FIG. 4. In one example, it detects both the fore/aft position of the two vehicles relative to one another, in addition to the side-to-side position. This is indicated by block 270. It can do this based on position signals generated from position sensors on the vehicles themselves, as indicated by block 272. For instance, each vehicle can send equipment control system 135 a signal indicative of its geographic location, and the vehicle position detectors 204 and 206 can then determine the relative position of the two vehicles based on those sensor signals.

In another example, the relative position of the vehicles is determined from a relative position sensor on either a single vehicle or on the conveyance system 106, or from a remotely located relative position sensor. This is indicated by block 274. For instance, one of the vehicles may have a geographic position sensor and a radar or other relative position sensor that detects the position of the other vehicle relative to its own position. It can send this relative position information to position detector system 184. In that case, the absolute position of the two vehicles and the conveyance system is not as important because the relative position of those items is detected. Of course, the two positions (the absolute position and the relative position) can be detected and used as well. The position of the vehicles relative to one another can be detected in other ways as well, and this is indicated by block 276.

Equipment control system 135 then generates action signals based upon the detected positions. This is indicated by block 278. For instance, it can generate a signal that is output on a user interface mechanism on the vehicles, for observation by an operator. This is indicated by block 280. The output may direct the operator where to position the corresponding vehicle, or provide other information.

The action signal may be the first and second vehicle position controller signals generated by controllers 216 and 218 (in FIG. 3) to control the speed and direction of the vehicles in order to automatically move them into the desired position relative to one another. This is indicated by block 282. The action signal may be a wide variety of other action signals as well, and this is indicated by block 284.

The vehicle detection logic 198 then continues to detect the relative position of the vehicles to determine whether they are in the correct position in order to commence the conveyance operation. This is indicated by block 286 in FIG. 4. If not, processing returns to block 268 where the position is detected and the vehicles are controlled to move them into the correct position.

Once they are in the correct position, then securing mechanism controller 224 in equipment control system 135 generates a control signal to control the conveyor securing mechanisms to release the conveyor from its travel or storage position, so that it can be moved into the desired conveyance position. This is indicated by block 288 in FIG. 4.

Conveyor position detection logic 200 then detects the position of conveyance system 106 relative to the two vehicles 102 and 104. This is indicated by block 290 in FIG. 4. In one example, logic 200 includes the two position detectors 210 and 212 that detect the position of the ends of the conveyor relative to the container openings on the two vehicles. This is indicated by block 292. In another example, the position and orientation of conveyance system 106 can be detected, based on sensor signals, and the relative position of the ends of the conveyance system relative to the two vehicles can be calculated from that based on known measurements for conveyance system 106. The position of the conveyance system relative to the two vehicles can be detected in other ways as well, and this is indicated by block 294.

Based upon the conveyor position relative to the two vehicles, conveyor position controller 220 (in FIG. 3) uses movement controller 226 to generate a movement signal or position signal to control the position of conveyance system 106 relative to the two vehicles, in order to place it in proper position for the conveyance operation. Generating the conveyor position control signal is indicated by block 292 in FIG. 4. Conveyor position detection logic 200 then continues to detect the position of the conveyor to determine when it is in the proper position. If it is not yet in the proper position, processing reverts to block 290. This is indicated by block 294 in the flow diagram of FIG. 4.

Vehicle closure mechanism controller 230 then detects the open/closed state of the closure mechanisms on the two vehicles. For instance, it illustratively detects whether lid 122 and door 120 are open or closed. This is indicated by block 296 in FIG. 4. It then generates one or more closure mechanism control signals to open the closure mechanisms so that the material can be conveyed. This is indicated by block 298.

Where a prescription is to be used in conveying the material, prescription processing system 192 performs any desired prescription processing to obtain an indication of how much material is to be conveyed. Where a prescription is not being used, then no prescription processing needs to be performed. This is indicated by block 300 in FIG. 4 and it is described in more detail below with respect to FIGS. 5 and 6.

Conveyor operation control system 190 then generates control signals to control the operation of conveyance system 106 in order to convey the desired material. This is indicated by block 302. For instance, on/off controller 232 can generate an on/off control signal to control actuator 154 (shown in FIG. 2) to turn on conveyance mechanism 114. This is indicated by block 304. Conveyor speed controller 234 can generate a control signal to control speed actuator 156 (also shown in FIG. 2) to control the speed of conveyance mechanism 114. This is indicated by block 306. The operation of conveyance system 106 can be controlled in other ways as well, and this is indicated by block 308.

During the conveyance operation, conveyed material detection system 188 can detect various characteristics indicative of an amount of conveyed material that has been conveyed during the operation. This is indicated by block 310. For instance, the container level detectors 238 and 240 on the first and/or second vehicles can be used to detect a change in the level of material in the containers, in order to identify how much material has been conveyed. This is indicated by block 312. Mass flow detector 244 can detect mass flow, and this can be used, in conjunction with a time period during which the operation has been performed, in order to identify an amount of material conveyed. This is indicated by block 314. Weight detector 242 can detect the weight of material that has been removed from vehicle 104, or the weight that has been added to vehicle 102, in order to identify an amount of material that has been conveyed. This is indicated by block 316. The amount of material that has been conveyed can be detected in other ways as well, and this is indicated by block 318.

Equipment control system 135 then detects when a desired amount of material has been conveyed. This is indicated by block 320. In one example, this can be based on the container level sensor signals that sense when a sufficient level of material has been conveyed to the container of vehicle 102. This is indicated by block 322. In another example, this can be detected by prescription administration logic 252 that determines, based upon the various sensor signals, when the prescribed amount of material has been conveyed from vehicle 104 to vehicle 102. This is indicated by block 324. In another example, an operator may visually observe the tank level or the amount of material that has been conveyed and provide an operator input indicating when a sufficient amount of material has been conveyed. This is indicated by block 326. Detecting when the desired amount of material has been conveyed can be performed in other ways as well, and this is indicated by block 328.

Conveyor operation control system 190 then generates conveyor operation control signals to stop the conveyance operation. This is indicated by block 330. For instance, vehicle closure mechanism controller 230 can generate a control signal to close the container (e.g., door 120) on the tender vehicle 104 to stop material from entering the hopper of conveyance system 106. This is indicated by block 332. In one example, this signal is generated such that the conveyor can be run until it is empty, but the tank on implement 102 will still not overflow or be overfilled. On/off controller 232 can then allow the conveyance system to continue to convey material until the conveyor is empty. This is indicated by block 334. In one example, conveyor speed controller 234 indicates the speed of the conveyor, and on/off controller 232 waits an appropriate amount of time, until the conveyor has fully emptied, based upon the controlled speed, and then turns the conveyor off. The conveyor operation control signals can be generated in other ways as well, and this is indicated by block 336.

Vehicle closure mechanism controller 230 then generates any control signals that are needed to close any open lids or tanks or other doors in architecture 100. For instance, if door 120 has already been closed on tender vehicle 104, then controller 230 generates a control signal to close lid 122. Generating the control signals to close any open containers is indicated by block 338 in FIG. 4.

It may be that more conveyance operations are to be performed to convey other material from tender vehicle 104 to implement 102. For instance, when tender vehicle 104 has multiple containers of different types of material, and where implement 102 also has multiple containers that receive different types of material (such as a container for seed and a container for fertilizer, etc.), then there may be additional conveyance operations that are to be performed between the two vehicles. Determining whether more conveyance operations are to be performed before the vehicles are moved out of position is indicated by block 340 in FIG. 4. If so, processing reverts to block 290 where the conveyor is repositioned as appropriate, and the next conveyance operation is commenced.

However, if there are no more conveyance operations to be performed before the two vehicles are moved out of position, then it is determined whether there are more conveyance operations that need to be performed between the two vehicles, but where repositioning of the vehicles is needed to perform those operations. This is indicated by block 342. For instance, it may be that tender vehicle 104 is a multi-container semi and that it needs to be moved forward or rearward relative to vehicle 102 before the next material can be conveyed to vehicle 102. In that case, processing reverts to block 268 where the position of the vehicles are detected and they are moved into the appropriate fore/aft and side-to-side positions in order to commence any additional conveyance operations.

However, if, at block 342, it is determined that no further conveyance operations are to be performed between the two vehicles, conveyor position controller 220 generates control signals to move the conveyance system 106 to its storage or travel position. This is indicated by block 344 in FIG. 4. Securing mechanism controller 224 also generates control signals to control the conveyor securing mechanism actuators 142 in order to secure the conveyor in the storage or travel position. This is indicated by block 346.

Communication system 182 can also generate an output signal indicative of the results of the conveyance operation. This is indicated by block 348. The output signal may indicate, for instance, a quantity of material that was conveyed, the type of material, the particular vehicles involved in the conveyance operation, the location of the field where the material was conveyed, an identity of the operator of the vehicles involved, a date and time of the conveyance operation, how long it took, and a wide variety of other information. The output signal can be provided to a local storage system (such as local data store 195), or to a remote system where it may be stored, saved for access by other users, further analyzed, etc. Storing the results of the conveyance operation either locally or remotely is indicated by block 350 in FIG. 4.

The output signal can be provided to an operator interface mechanism for an operator of one of the vehicles or the conveyance system, to show the results or to otherwise make them available. This is indicated by block 352. The output signal can be provided in a wide variety of other ways as well. This is indicated by block 354.

Figure 5:
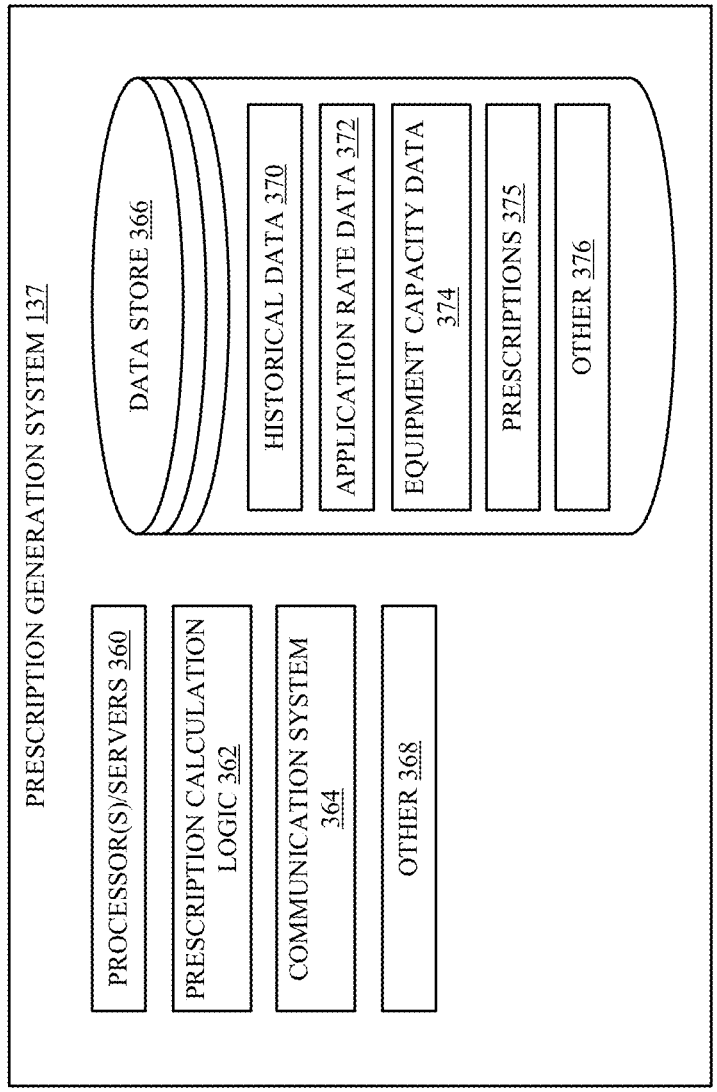
FIG. 5 is a block diagram of one example of a prescription generation system.

FIG. 5 is a block diagram of one example of prescription generation system 137. Prescription generation system 137 can be located remotely from equipment control system 135, or it can be located locally. It illustratively includes one or more processors or servers 360, prescription calculation logic 362, communication system 364, data store 366, and it can include other items 368. Data store 366 can include historical data 370, application rate data 372, equipment capacity data 374, already-calculated prescriptions 375, and a wide variety of other information 376.

Prescription calculation logic 362 illustratively accesses data in data store 366 to generate a prescription indicative of how much material is to be conveyed during a conveyance operation, or how much is to be applied to a particular field, or both. In doing so, it can obtain historical data 370 which is indicative of material that was applied to a field in prior years or during prior applications during a current year, etc. It can also obtain application rate data 372 which identifies a desired application rate for the material. This can be provided, for instance, by a manufacturer of the material, by a farmer or farm manager, or in other ways. Logic 362 can also obtain equipment capacity data 374 that identifies the capacity of the various containers on the various pieces of equipment involved in the conveyance operation. It can then generate a prescription indicative of an amount of material that should be conveyed during the conveyance operation. Communication system 364 can be used to not only receive a request for the prescription, but also to transmit the prescription to the equipment control system 135 that is requesting it.

Figure 6:
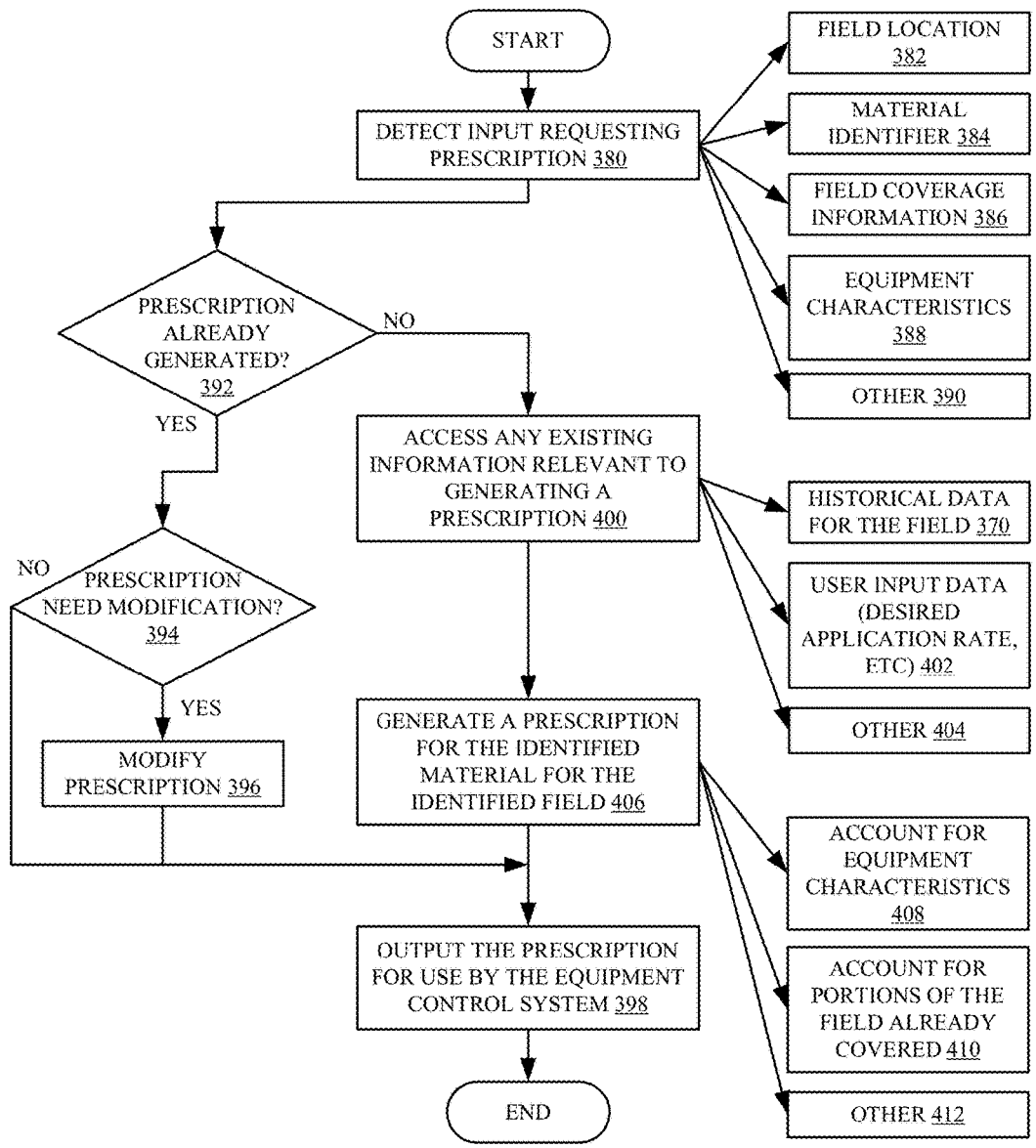
FIG. 6 is a flow diagram illustrating one example of how a prescription is processed in the conveyance architecture illustrated in FIGS. 1 and 2.

FIG. 6 is a flow diagram illustrating one example of the operation of prescription generation system 137, and architecture 100, in performing prescription processing. Prescription calculation logic 362 first detects an input indicating that a prescription has been requested. This is indicated by block 380 in FIG. 6. The request can provide a variety of information, or that information can be queried by prescription calculation logic 362. The information (which may be contained in the request or obtained through query) illustratively includes the field location 382, a material identifier 384 that identifies the material being conveyed, field coverage information 386 that may identify a portion of the field that has already been covered, equipment characteristics 388 that identify the particular equipment being used, the equipment capacities, etc. The information can include a wide variety of other information as well, and this is indicated by block 390.

Prescription calculation logic 362 then determines whether a prescription 375 has already been generated and stored in data store 366, that would service the request. This is indicated by block 392. If so, it determines whether the prescription needs modification, as indicated by block 394. For instance, it may be that the prescription has already been calculated for a given field, but part of that field has already been treated. Therefore, the prescribed amount may be cut down, based upon the remaining acreage that is yet to be treated. If modification is needed, then logic 362 illustratively modifies the prescription accordingly, at block 396, and the prescription is output for use by the equipment control system that requested it. This is indicated by block 398.

However, if, at block 392, the prescription has not yet been calculated, then prescription calculation logic 362 illustratively accesses any existing information relative to generating the requested prescription. This is indicated by block 400. The information may be, as mentioned above, historical data 370, the application rate data 372, or equipment capacity data 374, or user input data 402. It can include a wide variety of other information as well, and this is indicated by block 404.

Prescription calculation logic 362 then generates a prescription for the identified material, for the identified field. This is indicated by block 406. The prescription may account for the equipment characteristics (such as their capacities, etc.). This is indicated by block 408. It may also account for portions of the field that have already been covered, as indicated by block 410. The prescription can be calculated in a wide variety of other ways as well, and this is indicated by block 412.

Further, a variety of actuators have been discussed. The actuators can be hydraulic actuators, electric actuators, pneumatic actuators, air-over-hydraulic actuators, among a wide variety of others.

The present discussion has used the term "automatically". In one example, by "automatically" it is meant that the operation is performed without any further user input, except perhaps to initiate or authorize the operation.

The present discussion has also mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
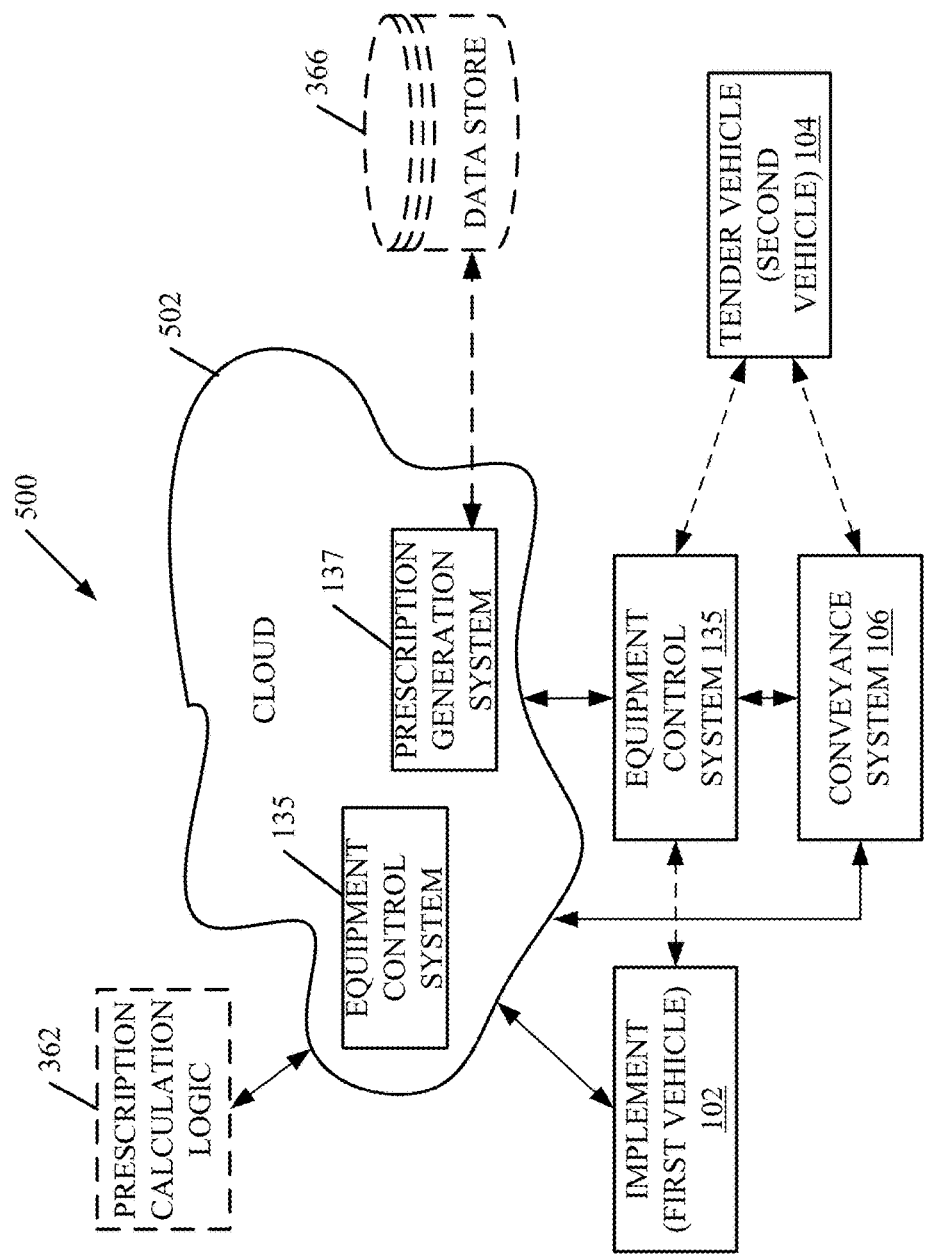
FIG. 7 shows the architecture illustrated in FIGS. 1 and 2, deployed in a remote server environment.

FIG. 7 is a block diagram of architecture 100, shown in FIGS. 1 and 2, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components or logic shown in FIGS. 1 and 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIGS. 1 and 2 and they are similarly numbered. FIG. 7 specifically shows that equipment control system 135 and/or prescription generation system 137 can be located at a remote server location 502. Therefore, equipment control system 135 and prescription generation system 137 can access one another and the other items in architecture 100 through remote server location 502.

FIG. 7 also depicts another example of a remote server architecture. FIG. 7 shows that it is also contemplated that some elements of FIGS. 1 and 2 are disposed at remote server location 502 while others are not. By way of example, prescription calculation logic 362 and data store 366 can be disposed at a location separate from location 502, and accessed through the remote server at location 502. Regardless of where they are located, they can be accessed directly by architecture 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the vehicle, or other item on which equipment control system 135 is disposed, comes close to the fuel truck for fueling, the system automatically collects the information from the vehicle using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the equipment control system 135 until it enters a covered location. The system 135, itself, can then send the information to the main network.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
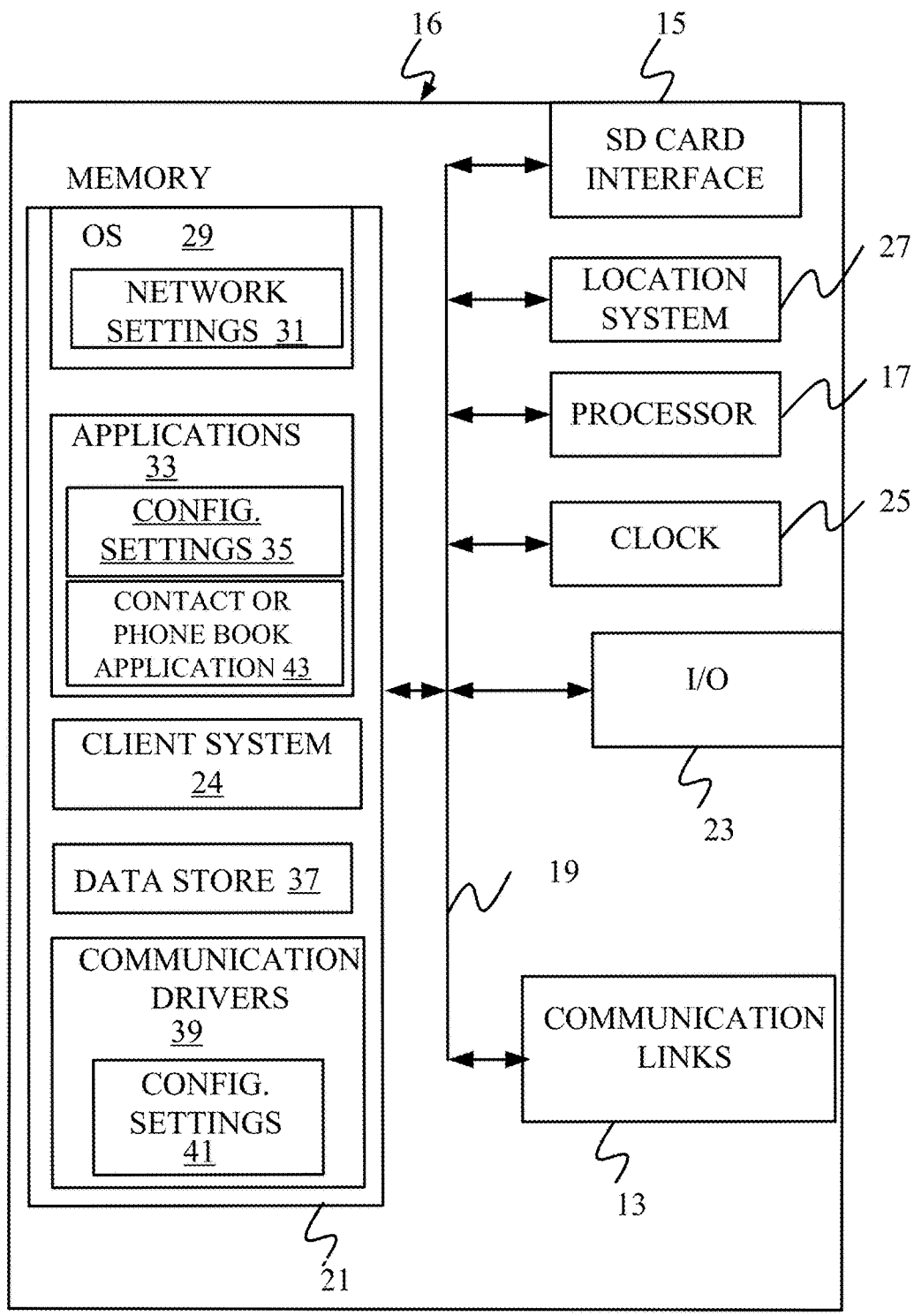
FIGS. 8-10 show examples of mobile devices that can be used in the architectures illustrated in previous figures.
Figure 9:
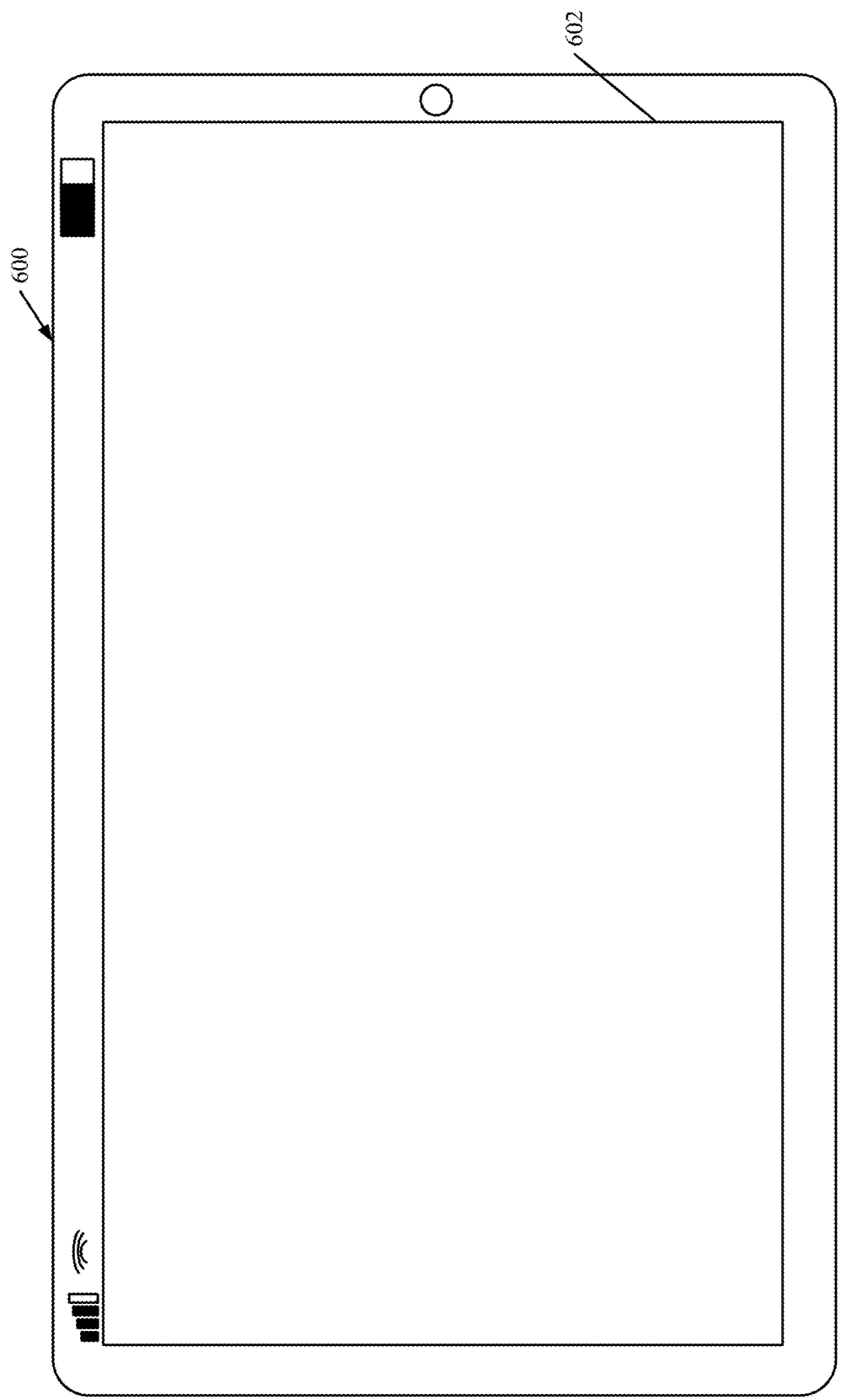
Figure 10:
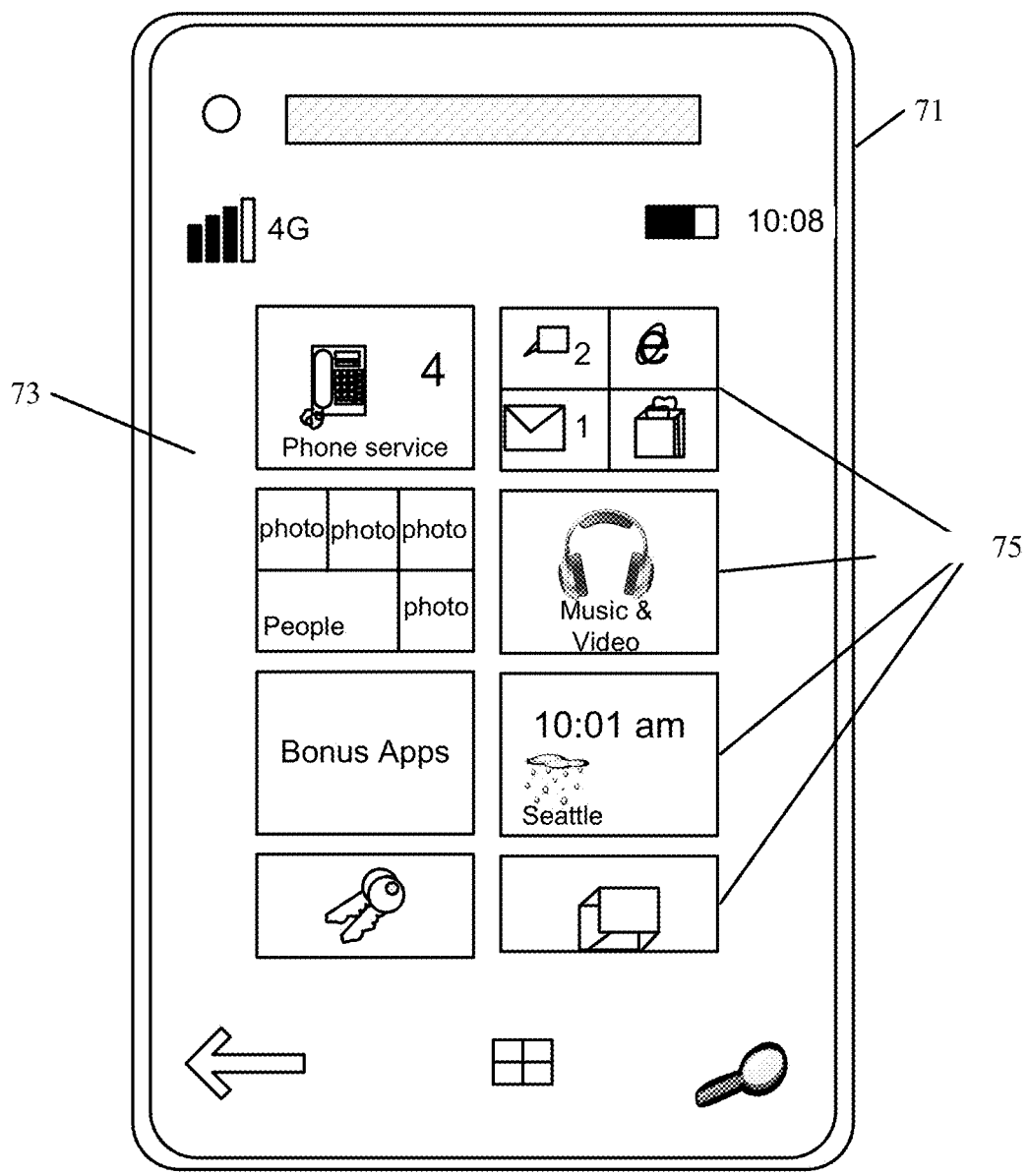

FIG. 8 is a simplified block diagram of one illustrative example of a handheld or mobile computing device that can be used as a user's or client's hand held device 16 and which can be used to access architecture 100 or, in which the present system (or parts of it) can be deployed. For instance, a mobile device can be deployed in the operator compartment of a vehicle 102 or 104 for use in generating, processing, or displaying data or controlling portions of architecture 100. FIGS. 9-10 are examples of handheld or mobile devices.

FIG. 8 provides a general block diagram of the components of a client device 16 that can run some components shown in FIGS. 1 and 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
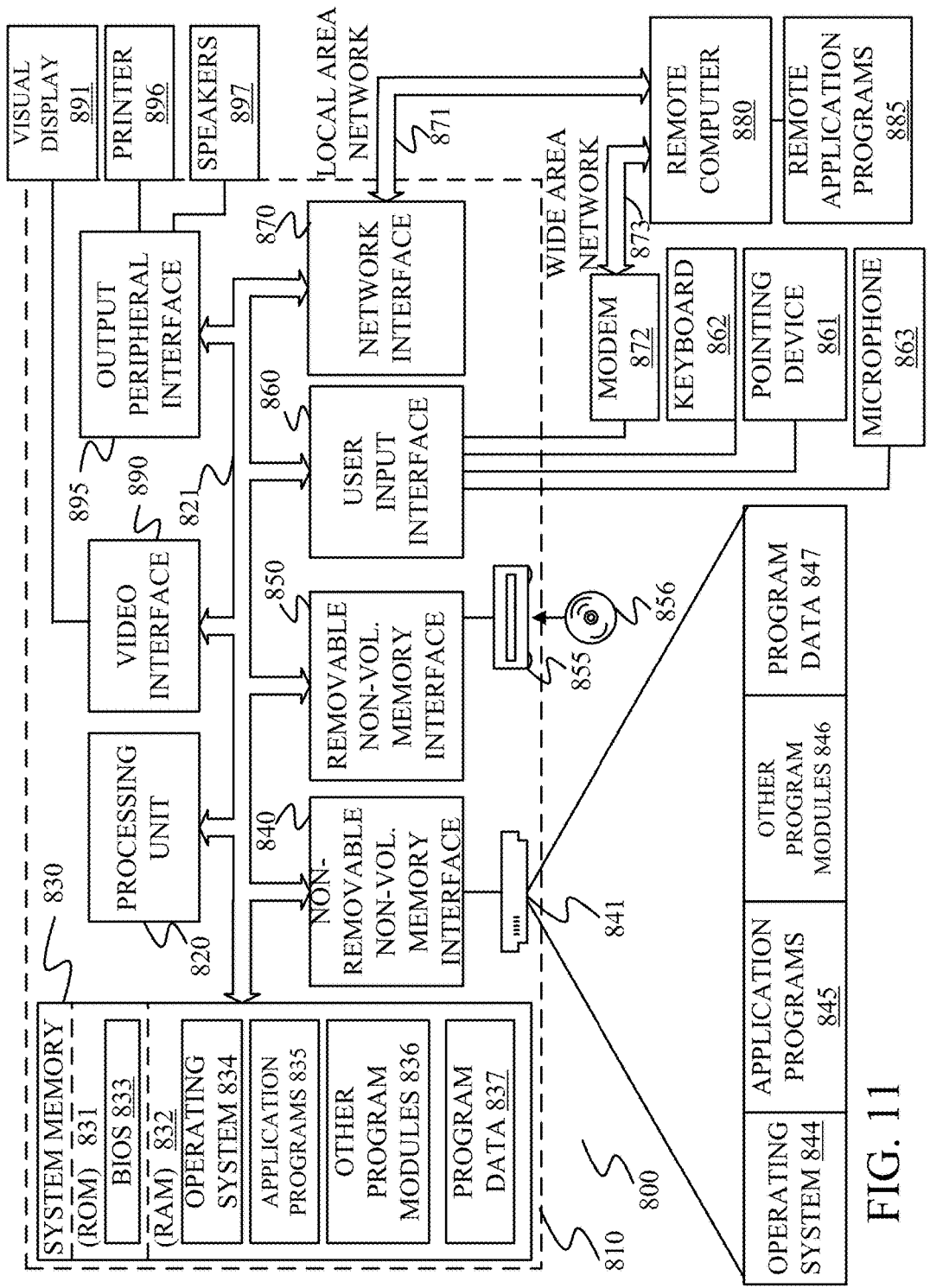
FIG. 11 is a block diagram of one example of a computing environment that can be used in the architectures shown in previous figures.

FIG. 11 is one example of a computing environment in which elements of FIGS. 1 and 2, or parts of them, (for example) can be deployed. With reference to FIG. 11, an example system for implementing some embodiments includes a general-purpose computing device in the form of a computer 810. Components of computer 810 may include, but are not limited to, a processing unit 820 (which can a comprise processor or server from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 2 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a control system, comprising:
- a location detector that detects a relative position of a first vehicle, carrying a material to deliver, and a second vehicle, that receives the material, and generates a location signal indicative of the relative position; and
- an equipment control system that receives the location signal and generates a conveyor position control signal to control a physical position of a conveyor relative to an outlet opening defined on the first vehicle and an inlet opening defined on the second vehicle based on the location signal, the equipment control system generating a conveyor operation to control a quantity of the material conveyed from the first vehicle into the second vehicle with the conveyor.

Example 2 is the control system of any or all previous examples and further comprising:
- a prescription processing system that receives a prescription indicative of a quantity of the material to be applied to a field and generates a quantity signal based on the prescription, the equipment control system generating the conveyor operation control signal based on the quantity signal.

Example 3 is the control system of any or all previous examples wherein the prescription processing system is configured to receive a field completion signal indicative of a portion of the field that has already been treated with the material and to generate the quantity signal to account for the portion of the field that has already been treated, based on the field completion signal.

Example 4 is the control system of any or all previous examples wherein the prescription identifies different quantities of the material to treat different locations of the field and wherein the prescription processing system receives a treated portion location signal indicative of a location of the portion of the field that has already been treated and generates the quantity signal to account for the location of the portion of the field that has already been treated, based on the treated portion location signal.

Example 5 is the control system of any or all previous examples wherein the prescription processing system is configured to receive a second vehicle capacity signal indicative of a capacity of the second vehicle for carrying the material and to generate the quantity signal to account for the capacity of the second vehicle, based on the second vehicle capacity signal.

Example 6 is the control system of any or all previous examples wherein the second vehicle includes a level sensor that senses a fill level of the second vehicle and generates a fill level signal indicative of the sensed fill level and wherein the equipment control system is configured to generate the quantity control signal to control the quantity of the material loaded from the first vehicle to the second vehicle based on the fill level signal.

Example 7 is the control system of any or all previous examples wherein the equipment control system receives a transferred quantity sensor signal indicative of a sensed quantity of the material that has been conveyed from the first vehicle to the second vehicle and generates the load quantity control signal based on the transferred quantity sensor signal.

Example 8 is the control system of any or all previous examples wherein the equipment control system generates the load quantity control signal to include a conveyor start/stop signal to control starting and stopping of the conveyor.

Example 9 is the control system of any or all previous examples wherein the first vehicle has a closing apparatus that moves between an opened position and a closed position to open and close the outlet opening, respectively, and a closing actuator that drives the closing apparatus between the opened position and the closed position and wherein the equipment control system comprises:
- a first vehicle control system that generates a first vehicle closing apparatus control signal to control the closing actuator on the first vehicle based on the quantity signal and the transferred quantity sensor signal.

Example 10 is the control system of any or all previous examples wherein the second vehicle has a closing apparatus that moves between an opened position and a closed position to open and close the inlet opening, respectively, and a closing actuator that drives the closing apparatus between the opened position and the closed position and wherein the equipment control system comprises:
- a second vehicle control system that generates a second vehicle closing apparatus control signal to control the closing actuator on the second vehicle based on the quantity signal and the transferred quantity sensor signal.

Example 11 is the control system of any or all previous examples wherein the prescription is indicative of a quantity of an additional material to treat the field wherein the prescription processing system generates an additional quantity signal corresponding to the additional material, based on the prescription and wherein the equipment control system receives the additional quantity signal and generates the conveyor position control signal to control the physical position of the conveyor relative to an additional outlet opening defined on the first vehicle and an additional inlet opening defined on the second vehicle based on the location signal, the equipment control system generating the loading quantity control signal to control a quantity of the additional material loaded from the first vehicle into the second vehicle with the conveyor based on the additional quantity signal.

Example 12 is a computer implemented method, comprising:
- detecting a location indicator indicative of a relative position of a first vehicle, carrying a material, and a second vehicle, that receives the material;
- identifying a quantity of the material to treat a field;
- generating a quantity signal based on the identified quantity;
- automatically generating a conveyor position control signal to control a physical position of a conveyor relative to an outlet opening defined on the first vehicle and an inlet opening defined on the second vehicle based on the location indicator; and generating a loading quantity control signal to control a quantity of the material loaded from the first vehicle into the second vehicle with the conveyor based on the quantity signal.

Example 13 is the computer implemented method of any or all previous examples wherein identifying a quantity of the material to treat the field comprises receiving a field completion signal indicative of a portion of the field that has already been treated with the material and wherein generating the quantity signal comprises:

generating the quantity signal to account for the portion of the field that has already been treated, based on the field completion signal.

Example 14 is the computer implemented method of any or all previous examples wherein identifying a quantity comprises, receiving a prescription that identifies different quantities of the material to treat different locations of the field and wherein receiving the field completed signal comprises receiving a treated portion location signal indicative of a location of the portion of the field that has already been treated and wherein generating the quantity signal comprises generating the quantity signal to account for the location of the portion of the field that has already been treated, based on the treated portion location signal.

Example 15 is the computer implemented method of any or all previous examples wherein identifying the quantity comprises receiving a second vehicle capacity signal indicative of a capacity of the second vehicle for carrying the material and wherein generating the quantity signal comprises generating the quantity signal to account for the capacity of the second vehicle, based on the second vehicle capacity signal.

Example 16 is the computer implemented method of any or all previous examples wherein the second vehicle includes a level sensor that senses a fill level of the second vehicle and generates a fill level signal indicative of the sensed fill level and wherein generating the quantity control signal comprises:

receiving the fill level signal; and generating the quantity control signal to control the quantity of the material loaded from the first vehicle to the second vehicle based on the fill level signal.

Example 17 is the computer implemented method of any or all previous examples wherein generating the load quantity sensor signal comprises:

receiving a transferred quantity sensor signal indicative of a sensed quantity of the material that has been transferred from the first vehicle to the second vehicle; and generating a conveyor control signal to control starting and stopping of the conveyor based on the transferred quantity sensor signal.

Example 18 is the computer implemented method of any or all previous examples wherein the first vehicle has a closing apparatus that moves between an opened position and a closed position to open and close the outlet opening, respectively, and a closing actuator that drives the closing apparatus between the opened position and the closed position and wherein generating the loading quantity control signal comprises:

generating a first vehicle closing apparatus control signal to control the closing actuator on the first vehicle based on the quantity signal and the transferred quantity sensor signal.

Example 19 is a control system, comprising:

a prescription processing system that receives a prescription indicative of a quantity of a material to treat a field and generates a quantity signal based on the prescription; and an equipment control system that receives a location signal indicative of a relative position of a first vehicle, carrying the material, and a second vehicle, that receives the material, and the quantity signal and generates a conveyor position control signal to control a physical position of a conveyor relative to an outlet opening defined on the first vehicle and an inlet opening defined on the second vehicle based on the location signal, the loading control system generating a loading quantity control signal to control a quantity of the material loaded from the first vehicle into the second vehicle with the conveyor based on the quantity signal.

Example 20 is the control system of any or all previous examples wherein the equipment control system receives a transferred quantity sensor signal indicative of a sensed quantity of the material that has been transferred from the first vehicle to the second vehicle and generates the load quantity control signal based on the transferred quantity sensor signal and wherein the first vehicle has a closing apparatus that moves between an opened position and a closed position to open and close the outlet opening, respectively, and a closing actuator that drives the closing apparatus between the opened position and the closed position, wherein the second vehicle has a closing apparatus that moves between an opened position and a closed position to open and close the inlet opening, respectively, and a closing actuator that drives the closing apparatus on the second vehicle between the opened position and the closed position and wherein the equipment control system comprises:

a first vehicle control system that generates a first vehicle closing apparatus control signal to control the closing actuator on the first vehicle based on the quantity signal and the transferred quantity sensor signal; and a second vehicle control system that generates a second vehicle closing apparatus control signal to control the closing actuator on the second vehicle based on the quantity signal and the transferred quantity sensor signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A control system, comprising:

a location detector that detects a relative position of a first vehicle, carrying a material to deliver, and a second vehicle, that receives the material, and generates a location signal indicative of the relative position; and an equipment control system that receives the location signal and generates a conveyor position control signal to control a physical position of a conveyor relative to an outlet opening defined on the first vehicle and an inlet opening defined on the second vehicle based on the location signal, the equipment control system generating a conveyor operation control signal to control a quantity of the material conveyed from the first vehicle into the second vehicle with the conveyor.

2. The control system of claim 1 and further comprising:
a prescription processing system that receives a prescription indicative of a quantity of the material to be applied to a field and generates a quantity signal based on the prescription, the equipment control system generating the conveyor operation control signal based on the quantity signal.

3. The control system of claim 2 wherein the prescription processing system is configured to receive a field completion signal indicative of a portion of the field that has already been treated with the material and to generate the quantity signal to account for the portion of the field that has already been treated, based on the field completion signal.

4. The control system of claim 3 wherein the prescription identifies different quantities of the material to treat different locations of the field and wherein the prescription processing system receives a treated portion location signal indicative of a location of the portion of the field that has already been treated and generates the quantity signal to account for the location of the portion of the field that has already been treated, based on the treated portion location signal.

5. The control system of claim 3 wherein the prescription processing system is configured to receive a second vehicle capacity signal indicative of a capacity of the second vehicle for carrying the material and to generate the quantity signal to account for the capacity of the second vehicle, based on the second vehicle capacity signal.

6. The control system of claim 1 wherein the second vehicle includes a level sensor that senses a fill level of the second vehicle and generates a fill level signal indicative of the sensed fill level and wherein the equipment control system is configured to generate the quantity control signal to control the quantity of the material loaded from the first vehicle to the second vehicle based on the fill level signal.

7. The control system of claim 1 wherein the equipment control system receives a transferred quantity sensor signal indicative of a sensed quantity of the material that has been conveyed from the first vehicle to the second vehicle and generates the load quantity control signal based on the transferred quantity sensor signal.

8. The control system of claim 7 wherein the equipment control system generates the load quantity control signal to include a conveyor start/stop signal to control starting and stopping of the conveyor.

9. The control system of claim 7 wherein the first vehicle has a closing apparatus that moves between an opened position and a closed position to open and close the outlet opening, respectively, and a closing actuator that drives the closing apparatus between the opened position and the closed position and wherein the equipment control system comprises:
a vehicle closure mechanism control system that generates a first vehicle closing apparatus control signal to control the closing actuator on the first vehicle based on the quantity signal and the transferred quantity sensor signal.

10. The control system of claim 7 wherein the second vehicle has a closing apparatus that moves between an opened position and a closed position to open and close the inlet opening, respectively, and a closing actuator that drives the closing apparatus between the opened position and the closed position and wherein the equipment control system comprises:
a vehicle closure mechanism control system that generates a second vehicle closing apparatus control signal to control the closing actuator on the second vehicle based on the quantity signal and the transferred quantity sensor signal.

11. The control system of claim 2 wherein the prescription is indicative of a quantity of an additional material to treat the field wherein the prescription processing system generates an additional quantity signal corresponding to the additional material, based on the prescription and wherein the equipment control system receives the additional the quantity signal and generates the conveyor position control signal to control the physical position of the conveyor relative to an additional outlet opening defined on the first vehicle and an additional inlet opening defined on the second vehicle based on the location signal, the equipment control system generating the loading quantity control signal to control a quantity of the additional material loaded from the first vehicle into the second vehicle with the conveyor based on the additional quantity signal.

12. A computer implemented method, comprising:
detecting a location indicator indicative of a relative position of a first vehicle, carrying a material, and a second vehicle, that receives the material;
identifying a quantity of the material to treat a field;
generating a quantity signal based on the identified quantity;
automatically generating a conveyor position control signal to control a physical position of a conveyor relative to an outlet opening defined on the first vehicle and an inlet opening defined on the second vehicle based on the location indicator; and
generating a loading quantity control signal to control a quantity of the material loaded from the first vehicle into the second vehicle with the conveyor based on the quantity signal.

13. The computer implemented method of claim 12 wherein identifying a quantity of the material to treat the field comprises receiving a field completion signal indicative of a portion of the field that has already been treated with the material and wherein generating the quantity signal comprises:
generating the quantity signal to account for the portion of the field that has already been treated, based on the field completion signal.

14. The computer implemented method of claim 13 wherein identifying a quantity comprises, receiving a prescription that identifies different quantities of the material to treat different locations of the field and wherein receiving the field completed signal comprises receiving a treated portion location signal indicative of a location of the portion of the field that has already been treated and wherein generating the quantity signal comprises generating the quantity signal to account for the location of the portion of the field that has already been treated, based on the treated portion location signal.

15. The computer implemented method of claim 13 wherein identifying the quantity comprises receiving a second vehicle capacity signal indicative of a capacity of the second vehicle for carrying the material and wherein generating the quantity signal comprises generating the quantity signal to account for the capacity of the second vehicle, based on the second vehicle capacity signal.

16. The computer implemented method of claim 12 wherein the second vehicle includes a level sensor that senses a fill level of the second vehicle and generates a fill level signal indicative of the sensed fill level and wherein generating the quantity control signal comprises:

receiving the fill level signal; and
generating the quantity control signal to control the quantity of the material loaded from the first vehicle to the second vehicle based on the fill level signal.

17. The computer implemented method of claim 12 wherein generating the load quantity sensor signal comprises:
receiving a transferred quantity sensor signal indicative of a sensed quantity of the material that has been transferred from the first vehicle to the second vehicle; and
generating a conveyor control signal to control starting and stopping of the conveyor based on the transferred quantity sensor signal.

18. The computer implemented method of claim 17 wherein the first vehicle has a closing apparatus that moves between an opened position and a closed position to open and close the outlet opening, respectively, and a closing actuator that drives the closing apparatus between the opened position and the closed position and wherein generating the loading quantity control signal comprises:
generating a first vehicle closing apparatus control signal to control the closing actuator on the first vehicle based on the quantity signal and the transferred quantity sensor signal.

19. A control system, comprising:
a prescription processing system that receives a prescription indicative of a quantity of a material to treat a field and generates a quantity signal based on the prescription; and
an equipment control system that receives a location signal indicative of a relative position of a first vehicle, carrying the material, and a second vehicle, that receives the material, and the quantity signal and generates a conveyor position control signal to control a physical position of a conveyor relative to an outlet opening defined on the first vehicle and an inlet opening defined on the second vehicle based on the location signal, the equipment control system generating a load quantity control signal to control a quantity of the material loaded from the first vehicle into the second vehicle with the conveyor based on the quantity signal.

20. The control system of claim 19 wherein the equipment control system receives a transferred quantity sensor signal indicative of a sensed quantity of the material that has been transferred from the first vehicle to the second vehicle and generates the load quantity control signal based on the transferred quantity sensor signal and wherein the first vehicle has a closing apparatus that moves between an opened position and a closed position to open and close the outlet opening, respectively, and a closing actuator that drives the closing apparatus between the opened position and the closed position, wherein the second vehicle has a closing apparatus that moves between an opened position and a closed position to open and close the inlet opening, respectively, and a closing actuator that drives the closing apparatus on the second vehicle between the opened position and the closed position and wherein the equipment control system comprises:
a first vehicle control system that generates a first vehicle closing apparatus control signal to control the closing actuator on the first vehicle based on the quantity signal and the transferred quantity sensor signal; and
a second vehicle control system that generates a second vehicle closing apparatus control signal to control the closing actuator on the second vehicle based on the quantity signal and the transferred quantity sensor signal.

* * * * *